United States Patent [19]

Nishida et al.

[11] Patent Number: 5,224,908
[45] Date of Patent: Jul. 6, 1993

[54] AUTOMATIC TRANSMISSION

[75] Inventors: Masaaki Nishida; Chihiro Hosono; Yoichi Hayakawa, all of Aichi, Japan

[73] Assignee: Aisin AW Co., Ltd., Japan

[21] Appl. No.: 752,532

[22] PCT Filed: Nov. 15, 1990

[86] PCT No.: PCT/JP90/01482
§ 371 Date: Sep. 6, 1991
§ 102(e) Date: Sep. 6, 1991

[87] PCT Pub. No.: WO91/07608
PCT Pub. Date: May 30, 1991

[30] Foreign Application Priority Data

Nov. 15, 1989 [JP] Japan .................. 1-294827

[51] Int. Cl.$^5$ .............................................. F16H 57/10
[52] U.S. Cl. ..................................... 475/283; 475/282
[58] Field of Search ............... 475/47, 53, 55, 282, 475/283, 288, 289, 311, 312, 313, 317, 318, 319, 330

[56] References Cited

U.S. PATENT DOCUMENTS

| | | | |
|---|---|---|---|
| 4,716,787 | 1/1988 | Miura et al. | 475/146 |
| 4,916,977 | 4/1990 | Aoki et al. | 475/283 X |
| 4,934,215 | 6/1990 | Miura et al. | 475/283 |
| 4,994,007 | 2/1991 | Miura et al. | 475/283 X |
| 5,006,102 | 4/1991 | Takase et al. | 475/282 |

FOREIGN PATENT DOCUMENTS

| | | |
|---|---|---|
| 60-84849 | 6/1985 | Japan . |
| 62-93546 | 4/1987 | Japan . |
| 62-141344 | 6/1987 | Japan . |
| 63-145846 | 6/1988 | Japan . |
| 63-259253 | 10/1988 | Japan . |
| 1-55454 | 3/1989 | Japan . |
| 2-125128 | 5/1990 | Japan . |

Primary Examiner—Richard M. Lorence
Assistant Examiner—Benjamin Levi
Attorney, Agent, or Firm—Lorusso & Loud

[57] ABSTRACT

An automatic four forward transmission with a length in the axial direction and the weight thereof not increased, wherein; the automatic transmission is constituted by a single planetary gear (10), a dual planetary gear (11) provided adjacent to said gear, in which a sun gear is formed integrally therewith and a carrier is integrally connected thereto, an input shaft (15), and a clutch (C3) for engaging the input shaft (15) with the ring gear of the single planetary gear (10) or disengaging the former from the latter through a connecting member (16); the connecting member (16) is the connected to the ring gear of the dual planetary gear (11) through a clutch (C0), a brake (B1) for engaging a disengaging the sun gear and a brake (B2) for engaging or disengaging the ring gear of the dual planetary gear (11) are provided, and an output gear (13) is provided on the carrier.

7 Claims, 5 Drawing Sheets

Fig.4

| | | SOLENOID | | | CLUTCH | | | | BRAKE | | O.W.C | | GEAR RATIO |
|---|---|---|---|---|---|---|---|---|---|---|---|---|---|
| | | NO.1 | NO.2 | NO.3 | C0 | C1 | C2 | C3 | B1 | B2 | F0 | F1 | |
| P | | O | × | × | × | × | × | × | × | × | × | × | |
| R | V≤7 | O | × | × | × | × | O | × | × | O | × | × | 2.769 |
| | V>7 | × | O | × | × | × | O | × | × | × | × | × | |
| N | | O | × | × | × | × | × | × | × | × | × | × | |
| D | 1ST | O | × | × | × | O | × | × | × | × | O | O | 2.807 |
| | 2ND | O | O | × | × | O | × | × | O | × | O | × | 1.479 |
| | 3RD | × | O | ◎ | O | O | × | O | ◎ | × | O | × | 1.000 |
| | 4TH | × | × | ◎ | O | O | × | × | O | × | × | × | 0.735 |
| 2 | 1ST | O | × | × | × | O | × | O | × | × | O | O | |
| | 2ND | O | O | × | × | O | × | O | O | × | O | × | |
| | 3RD | × | O | × | O | O | × | O | ◎ | × | O | × | |
| | (3RD) | × | × | × | O | O | × | O | ◎ | × | O | × | |
| 1 | 1ST | O | × | × | × | O | × | O | × | O | O | O | |
| | 2ND | O | O | × | × | O | × | O | O | × | O | × | |
| | (2ND) | × | O | × | O | O | × | O | O | × | O | × | |
| | (1ST) | × | × | × | × | O | × | O | × | O | O | O | |

| REMARKS | O | ON | ENGAGE |
|---|---|---|---|
| | × | OFF | RELEASE |
| | ◎ | ON: L-up ON / OFF: L-up OFF | B1 RELEASED ON RELEASE PRESSURE |

AUTOMATIC TRANSMISSION

TECHNOLOGICAL FIELD

The present invention relates to an automatic transmission for an automobile.

TECHNOLOGICAL BACKGROUND

In the prior art, the automatic transmission for automobile is composed of a plurality of planetary gear units, and frictional engagement components such as brakes or clutches connected to the individual components of said planetary gear units so that it can realize individual gear stages by having the individual frictional engagement components selectively engaged. Generally speaking, a simpson type automatic transmission establishes three forward speeds and is equipped with two single planetary gear units, in which these single planetary gear units have their sun gears shared, and in which the carrier of the first planetary gear unit and the ring gear of the second planetary gear unit are integrally connected.

In order to establish a fourth speed, moreover, an overdrive mechanism or under drive mechanism composed of a single planetary gear unit is added to the three-speed automatic transmission mechanism which acts as a base composed of the aforementioned two planetary gear units.

In recent years, the need for shortening the axial size of the automatic transmission has become more acute because of the FF trend (i.e., front engine and front drive) in automobiles.

To meet this need, there has been provided a structure in which the aforementioned three-spaced automatic transmission mechanism and the overdrive mechanism or underdrive mechanism are arranged on two parallel axes (as disclosed in Japanese Patent Laid-Open No. 62-141343 or corresponding U.S. Pat. No. 4,716,787).

In the automatic transmission having the structure thus far described, however, the three-speed automatic transmission mechanism and the overdrive or underdrive mechanism are arranged on the two axes so that the overall axial length can be reduced. However, the weight of the automatic transmission is increased because planetary gear unit is required for forming the overdrive or underdrive mechanism.

DISCLOSURE OF THE INVENTION

An object of the present invention is to solve the aforementioned problems of the automatic transmissions of the prior art and to provide a forward four-speed automatic transmission which is freed from any increase in the axial size and in the weight. In order to achieve the above-specified object, according to the present invention, there is provided an automatic transmission which comprises: a single planetary gear unit 10; a dual planetary gear 11 disposed adjacent to said single planetary gear unit 10 and having a sun gear formed integrally therewith and a carrier connected integrally thereto; an input shaft 15 extending from the output member of a torque converter 50; a clutch C1 for engaging or releasing said input shaft 15 and the ring gear R1 of said single planetary gear 10 through a connecting member 16; and a clutch C2 for engaging or releasing said input shaft 15 and said sun gear, wherein said connecting member 16 is connected to the ring gear R2 of the dual planetary gear 11 through a clutch C0, wherein there are provided a brake B1 for engaging or releasing said sun gear and a brake B2 for engaging or releasing the ring gear of said dual planetary gear 11, and wherein an output gear 13 is connected to said carrier.

There may be a further provided a clutch C3 and a one-way clutch F0 for engaging or releasing said connecting member 16 and the ring gear R1 of said single planetary gear 10, and a one-way clutch F1 for engaging or releasing the ring gear R2 of said dual planetary gear 11.

Moreover, the clutch C3 for engaging or releasing said connecting member 16 and the ring gear R1 of said single planetary gear 10 may be arranged adjacent to the ring gear R2 of said single planetary gear 10.

Brake B1 for engaging or releasing the sun gear and the clutch C2 for engaging or releasing the input shaft 15 and the sun gears are disposed adjacent to each other, and the aforementioned output gear 13 may be arranged between the brake and clutch and the planetary gear.

According to the present invention, as has been described above, the automatic transmission comprises: a single planetary gear 10; a dual planetary gear 11 disposed adjacent to said single planetary gear 10 and having a sun gear S1 formed integrally therewith and a carrier connected integrally thereto; an input shaft 15 extending from the output member of a torque converter 50; a clutch C1 for engaging or releasing the input shaft 15 and the ring gear of said single planetary gear 10 through a connecting member 16; and a clutch C2 for engaging or releasing the input shaft 15 and the sun gear, wherein the connecting member 16 is connected to the ring gear of the dual planetary gear 11 through a clutch C0, wherein there are provided a brake B1 for engaging or releasing the sun gears and a brake B2 for engaging or releasing the ring gear of the dual planetary gear 11, and wherein an output gear 13 is connected to the carrier. As a result, it is possible to provide a forward four-speed automatic transmission which is freed from any increase in the axial size or weight even with the two planetary gear units. Given the one-way clutch F0 for engaging or releasing the aforementioned connecting member 16 and the ring gear of the single planetary gear 10, at the time of an upshift from the 3rd to 4th speeds, therefore, the one-way clutch F0 is locked, if the clutch C3 is released, and is released if the brake B1 is engaged, so that the shift shocks are lightened.

There is provided the one-way clutch F1 for engaging or releasing the ring gear of the dual planetary gear 11, the shift shocks, which might otherwise be caused by the engagement change, can be prevented at the upshift from the 1st to 2nd speeds.

Since the clutch C0 for engaging or releasing the connecting member 16 and the ring gear of the single planetary gear 10 is arranged adjacent to the ring gear of the single planetary gear 10, it can have its parts shared with the clutch C3 so that the axial length can be shortened. Moreover, the clutch cylinder for connecting said clutch C0 can be dispensed with, and the r.p.m. sensor can be arranged at the side of the input shaft. Furthermore, the brake B1 for engaging or releasing the aforementioned sun gear and the clutch C2 for engaging or releasing the aforementioned input shaft 13 and the aforementioned sun gear are disposed adjacent to each other, and the aforementioned output gear 13 is arranged between those brake B1 and clutch C2 and the planetary gear so that the axial size of the automatic transmission can be shortened.

BRIEF DESCRIPTION OF THE DRAWINGS

FIG. 4 is a table enumerating the operations of the automatic transmission of the present invention.

BEST MODE FOR CARRYING OUT THE INVENTION

The present invention will be described in detail in the following in connection with the embodiment thereof with reference to the accompanying drawings.

Figure 1:
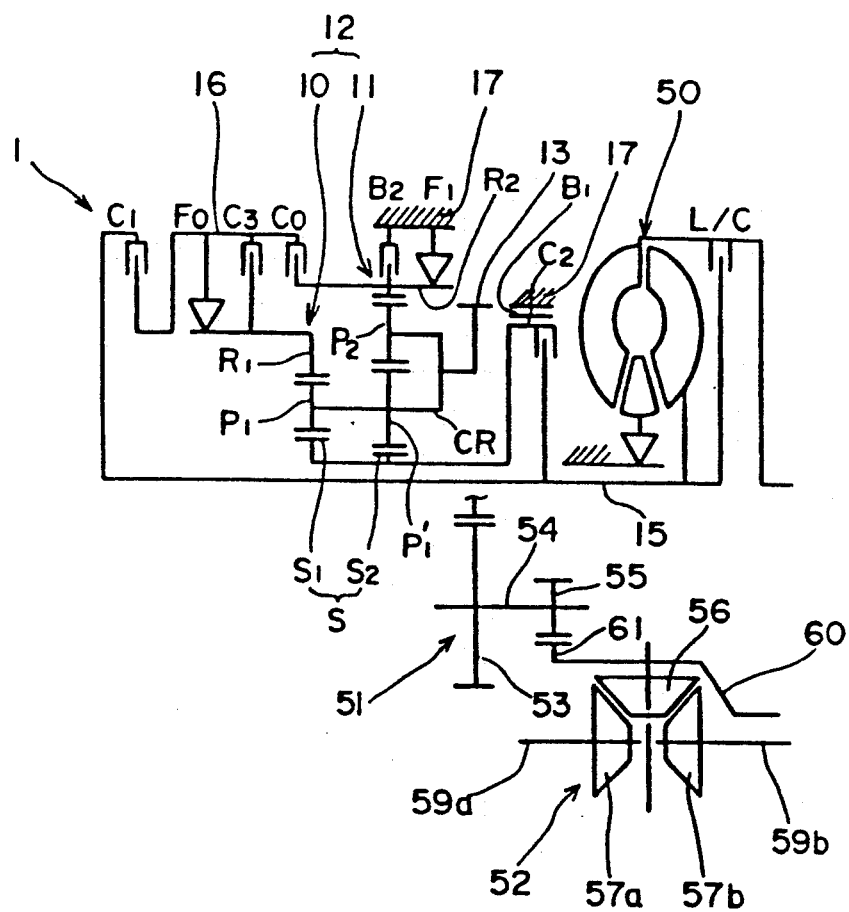
FIG. 1 is a skeleton diagram showing the automatic transmission of the present invention.
Figure 2:
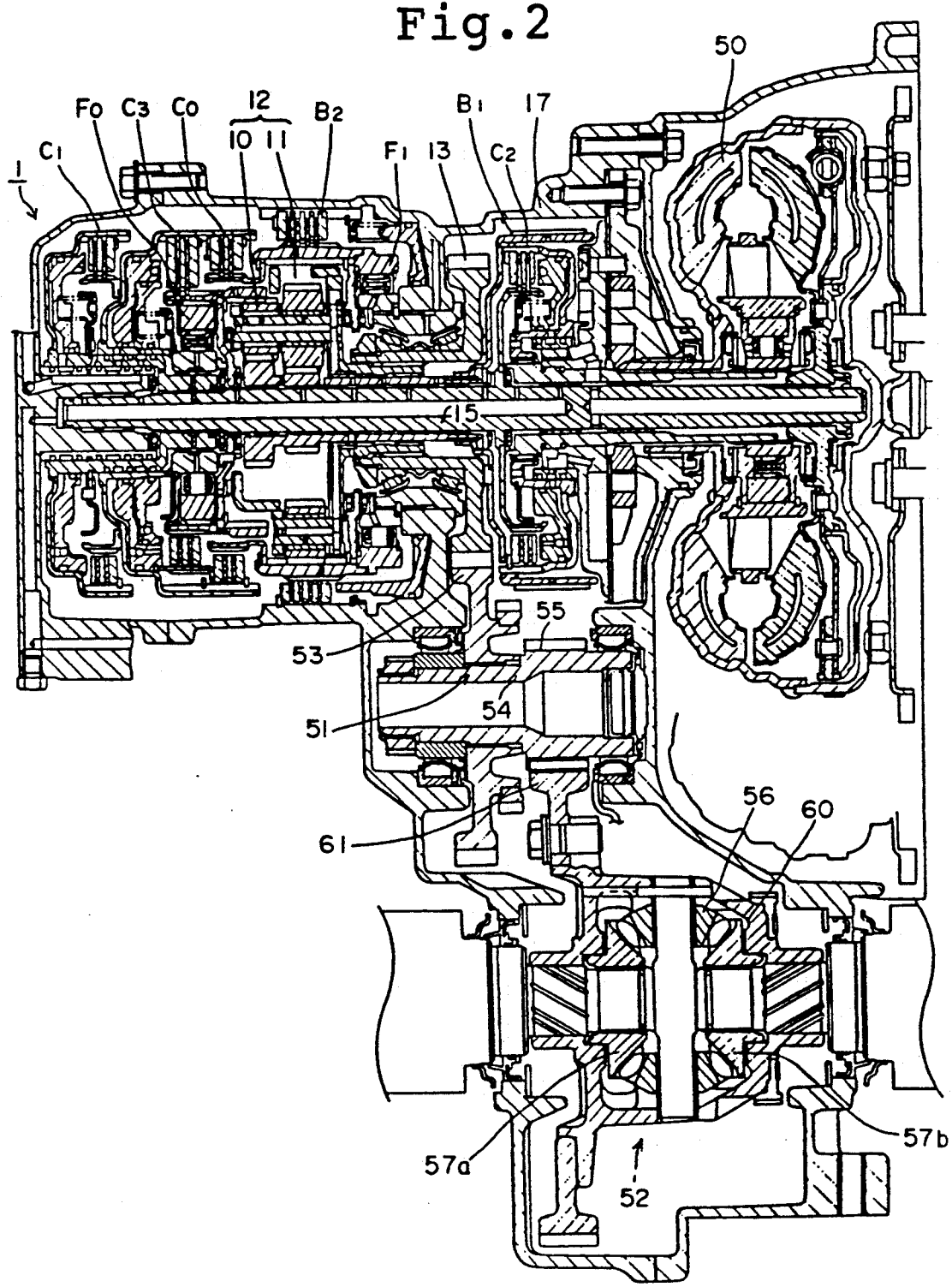
FIG. 2 is a section showing the automatic transmission of the present invention.

FIGS. 1 and 2 show an embodiment of a" and delete "A", second instance; four-speed automatic transmission A according to the present invention which includes a torque converter 50 having a lockup clutch L/C, a four-speed transmission gear mechanism 1, a reduction mechanism 51 and a differential mechanism 52.

The four-speed shift gear mechanism 1 is equipped with a planetary gear unit 12 which is made by coupling a single planetary gear 10 and a dual planetary gear 11. This gear unit 12 has its sun gears S1 and S2 integrated into a sun gear S. Moreover, pinions P1 and P1' meshing with the sun gears S1 and S2 share a carrier CR inbetween. This carrier CR is shared with that CR supporting said pinions and a pinion P2 meshing with a ring gear (as will be referred to as the "large ring gear") R2 of the dual planetary gear 11.

Moreover, an input shaft 15 extending from the output member of the torque converter 50 is connected through a first clutch C1 to a connecting member 16 and through a second clutch C2 to the sun gear S. Between the connecting member 16 and the ring gear (as will be referred to as the "small ring gear") R1 of the single planetary gear 10, there are interposed the third clutch C3 and a second one-way clutch F0. A fourth clutch C0 is interposed between the connecting member 16 and the large ring gear R2. On the other hand, the aforementioned sun gear S can be stopped by a first brake B1 which is a band brake. Between the large ring gear R2 and a casing 17, there are interposed a second brake B2 and a first one-way clutch F1. Moreover, the carrier CR is connected to an output gear 13 which is positioned generally at the center of the shift gear mechanism 1.

Reduction mechanism 51 is equipped with a counter shaft 54 which is rotatably supported by the casing 17. On the counter shaft 54, there are fixed a large gear 53 meshing with the aforementioned output gear 13 at all times, and a small gear 55. On the other hand, the differential mechanism 52 is composed of a differential pinion 56 and lefthand and righthand pinions 57a and 57b meshing with each other. These pinions 57a and 57b are fixed on lefthand and righthand front axles 59a and 59b, respectively. The differential pinion 56 is supported by a differential carrier 60 which in turn is rotatably supported by the casing 17. On the differential carrier 60, there is fixed a ring gear 61 which meshing with the aforementioned small gear 55 at all times.

Figure 3A:
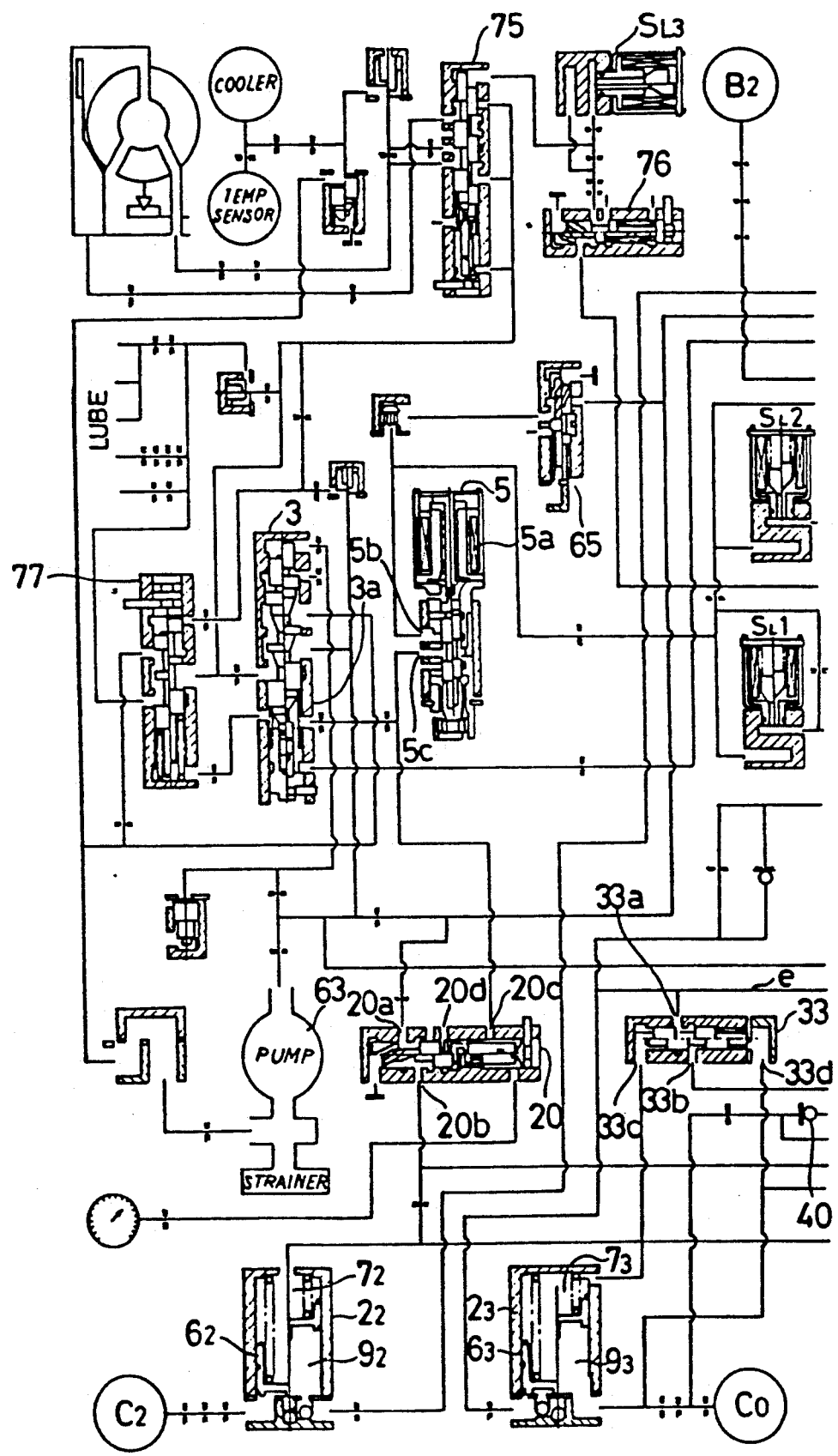
FIGS. 3-a and 3-b are diagrams showing the hydraulic control system of the automatic transmission of the present invention.
Figure 3B:
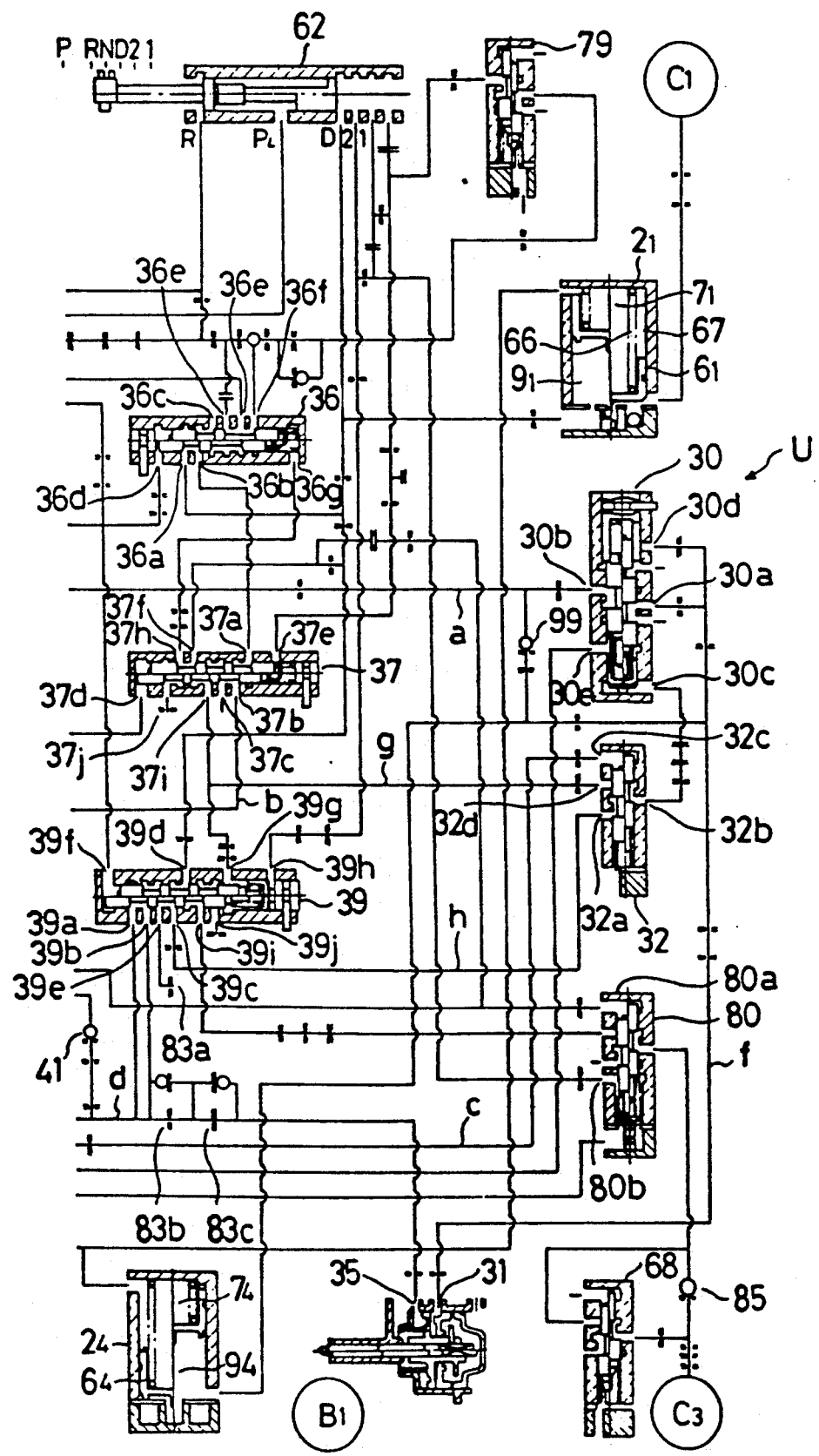

FIGS. 3-a and 3-b are diagrams showing the hydraulic control system of the automatic transmission of the present invention. The hydraulic control system includes hydraulic servos $C_1$, $C_2$, $C_3$ and $C_0$, and $B_1$ and $B_2$ for actuating the clutches C1, C2, C3 and C0 and the brakes B1 and B2. respectively. Of these, the first clutch hydraulic servo $C_1$, the second clutch hydraulic servo $C_2$, the fourth clutch hydraulic servo $C_0$, and the first brake hydraulic servo $B_1$ are respectively arranged with accumulators $2_1$, $2_2$, $2_3$ and $2_4$ in parallel therewith.

Moreover, reference numeral 62 designates a manual valve which has its oil passages switched by the shifting operations of the driver to individual ranges. The manual valve 62 has: its D port communicating with a line pressure passage PL in the D range; its D and 2nd ports in the 2nd range; its D, 2nd and 1st ports in the 1st range; and its R port in the R range.

3 designates a primary regulator valve which is actuated by a throttle pressure or the oil pressure coming from the R range port to regulate the oil pressure coming from a pump 63 to generate the line pressure. Numeral 5 designates a throttle pressure control valve which is controlled by an electric signal based upon the throttle opening to generate a predetermined throttle pressure (Pth).

The throttle pressure control valve 5 is equipped with a solenoid 5a, which is controlled by the electric signal coming from a not-shown control unit, and an input port 5b and an output port 5c. The throttle pressure Pth coming from the output port 5c is fed to a throttle pressure port 3a of the primary regulator valve 3 and to a feedback port 20c of an accumulator control valve 20.

65 designates a solenoid modulator valve for modulating the line pressure fed to the input port 5b of the throttle pressure control valve 5. The accumulator control valve 20 is equipped with not only an input port 20a but also a control port 20b and the feedback port 20c. The oil pressure at the control port 20b is fed to the back pressure chambers $7_1$ to $7_4$ of the aforementioned accumulators $2_1$ to $2_4$.

Accumulators $2_1$ to $2_4$ are equipped with pistons $6_1$ to $6_4$ which have the front faces defining accumulator chambers $9_1$ to $9_4$ communicating with the individual hydraulic servos and have their back faces defining the back pressure chambers $7_1$ to $7_4$ having pressure receiving areas equal to those of the accumulators chambers. At the front faces of said pistons $6_1$ to $6_4$, there are disposed a shorter spring 66 and a longer spring 67, as exemplified in the accumulator $2_1$.

Moreover, all of these accumulators are made to have an identical shape and to share common parts.

The third clutch hydraulic servo $C_3$ is equipped with a modulator valve 68, but the second brake hydraulic servo $B_2$ is fed either directly with the line pressure or indirectly with the modulator pressure through the modulator valve. Thus, both of these hydraulic servos $C_3$ and $B_2$ are not equipped with a accumulator.

The hydraulic control system further includes 1–2 shift valve 36, a 2–3 shift valve 37 and a 3–4 shift valve 39, of which: the 1–2 shift valve 36 and the 3–4 shift valve 39 are controlled by a second solenoid valve $S_L2$; and the 2–3 shift valve 37 is controlled by a first solenoid valve $S_L1$.

Specifically, the 1–2 shift valve 36 is formed with: a control oil chamber 36d exposed to the control oil pressure coming from the solenoid valve $S_L2$; a line pressure supply port 36a communicating with the D range port; an output port 36b; a drain port 36c; a $B_2$ port 36e; a low modulator port 36f; and a constraining control oil chamber 36g. The 1-2 shift valve 36a is held in its lower half position at the 2nd, 3rd and 4th speeds and is switched to its upper half position at the 1st speed. The 2-3 shift valve 37 is formed with: a control oil chamber 37d exposed to the control oil pressure coming from the solenoid valve $S_L1$; an input port communicating with an oil line a leading from the output port of the aforementioned 1-2 shift valve 36; an output port 37b communicating with the fourth clutch hydraulic servo $C_0$ via an oil line b; a drain port 37c; a 1st range constraining control oil chamber 37e; a D range line pressure supply port 37f; a port 37h communicating with the constraining control oil chamber 36g of the aforementioned 1-2 shift valve 36; a port 37i; and a drain port 37j. The 2-3 shift valve is held in its lower half position at the 1st and 2nd speeds and is switched to its upper half position at the 3rd and 4th speeds.

On the other hand, the 3-4 shift valve 39 is formed with: a control oil chamber 39f exposed to the control oil pressure coming from the solenoid valve $S_L2$; a $C_0$ port 39a; a $B_1$ release port 39b; a drain port 39e; a constraining control oil chamber 39g communicating with the aforementioned port 37i; a 2nd range constraining control oil chamber 39h; a $C_3$ port 39i; and a drain port 39j. The 3-4 shift valve 39 is held in its lower half position at the 1st, 2nd and 3rd speeds and is switched to its upper half position at the 4th speed.

Numeral 30 designates a $B_1$ modulator valve, which is formed with: a line pressure supply port 30b communicating with the oil line a leading from the output port 36b of the aforementioned 1-2 shift valve 36; a pressure modulation port 30a; a feedback port 30d; a constraining control oil chamber 30c; and a control oil chamber 30e communicating with the pressure control port 20b of the accumulator control valve 20. The $B_1$ modulator valve 30 reduces the line pressure coming from the line pressure supply port 30b at the predetermined ratio and outputs it to the pressure modulation port 30a, when no constraining control oil pressure is exerted upon the control oil chambers 30c and 30e.

32 designates a $B_1$ modulator control valve which is formed with: a first input port 32d communicating with an oil line g leading from the port 37i of the aforementioned 2-3 shift valve 37; a second input port 32a communicating with an oil line h leading from the port 39c of the aforementioned 3-4 shift valve 39; and an output port 32b communicating with the constraining control oil chamber 30c of the modulator valve 30. The $B_1$ modulator control valve 32 has its first input port 32d and output port 32b communicating with each other, when a control oil chamber 32c communicating with the hydraulic servo $C_0$ via an oil line c is relieved, and its second input port 32a and output port 32b communicating with each other when said control oil chamber 32c is fed with the oil pressure.

is branched off 2-3 timing valve 33, which branches the oil line b providing the communication between the output port 37b of the 2-3 shift valve 37 and the fourth clutch hydraulic servo $C_0$, is formed with: an input port 33a communicating with the output port 37b; an output port 33b communicating with the port 39a of the 3-4 shift valve 39; a first control oil chamber 33d communicating with the hydraulic servo $C_0$; and a second control oil chamber 33c communicating with the pressure control port 20b of the accumulator control valve 20. When the oil pressure of the hydraulic servo $C_0$ rises to a predetermined level, the 2-3 timing valve 33 has its input port 33a and output port 33b communicating with each other.

In an oil line d providing the communication between the hydraulic servo $C_0$ and the port 39a, there is disposed a check valve 40 for permitting the flow from the hydraulic servo $C_0$ to the port 39a. In an oil line e leading from said oil line d to the aforementioned oil line b, there is disposed a check valve 41 for allowing the oil to be discharged from the port 39a to the port 37b.

Numeral 75 designates a lockup clutch control valve; numeral 76 designates a lockup clutch modulator valve; and $S_L3$ designates a lockup clutch controlling solenoid valve. These valves are properly controlled at the gear stages which are indicated at double circles in the operation table of FIG. 4. Moreover, numeral 77 designates a second regulator valve, and numeral 80 designates a C3 timing valve.

Next, the operations of the present embodiment will be described in the following.

At the 1st speed in which the manual valve 62 is shifted to the D range, as shown in FIG. 4, the first solenoid valve $S_L1$ only is ON in the drain state, but the second solenoid valve $S_L2$ is OFF in the supply state.

In this state, the 1-2 shift valve 36 has its control oil chamber 36d fed with the oil pressure and is in its upper half position, and the 2-3 shift valve 37 has its control oil chamber 37d relieved from the oil pressure and is in its lower half position. Moreover, the 3-4 shift valve 39 has its control oil chamber 39f fed with the oil pressure but is constrained in its lower half position because its constraining control oil chamber 39g is fed with the line pressure from the line pressure supply port 37f of the 2-3 shift valve 37.

As a result, the first clutch hydraulic servo $C_1$ only is fed with the line pressure from the D range port of the manual valve 62, but no other hydraulic servo is supplied with the oil pressure. At this time, the throttle pressure control valve 5 is suitably operated to generate the predetermined throttle pressure Pth on the basis of the signal coming from the control unit. Said throttle pressure Pth is applied to the signal port 20c of the accumulator control valve 20 so that the line pressure supplied to the input port 20a is reduced to a predetermined ratio by the feedback pressure, and this reduced oil pressure is fed from the output port 20b to the back pressure chambers $7_1$ to $7_4$ of the individual accumulators $2_1$ to $2_4$.

As a result, in the accumulator $2_1$ communicating with the hydraulic servo $C_1$, the oil pressure of the back pressure chamber $7_1$ is properly controlled in accordance with the engagement characteristics of the first clutch C1 by the throttle pressure control valve 5 so that said clutch C1 is smoothly engaged. Simultaneously with this, not only the line pressure by the primary regulator valve 3 but also the pressures in the back pressure chambers $7_2$ to $7_4$ of the remaining accumulators $2_2$ to $2_4$ are controlled on the basis of the controls of the throttle pressure control valve 5, but the remaining clutches C0, C2 and C3 and the brakes B1 and B2 are out of engagement and are not influenced in the least.

In the 1st speed state, moreover, in which not only said first clutch C1 but also the first and second one-way clutches F1 and F0 are engaged, the rotation of the input shaft 15 is transmitted to the smaller ring gear R1 through the first clutch C1 and the second one-way clutch F0. Since, in this state, the rotation of the larger ring gear R2 is blocked by the first one-way clutch F1, the carrier C4 is drastically decelerated, while allowing the sun gear S to rotate idly, so that the decelerated rotation is extracted from the output gear 13. Moreover, the rotation of this output gear 13 is decelerated by the reduction mechanism 51 and is transmitted to the left-hand and righthand accelerator shafts 59a and 59b by the differential mechanism 52.

In the 2nd speed state, on the other hand, the second solenoid valve $S_L2$ as well as the first solenoid valve $S_L1$ is turned ON. Then, the 2-3 shift valve 37 and the 3-4 shift valve 39 are held in their lower half positions, and the 1-2 shift valve 36 is switched to its lower half position by having its control oil chamber 36d relieved from the oil pressure. In this state, the line pressure of the D range port is applied to the oil line a via the line pressure supply port 36a and the output port 36b and further to the line pressure port 30b of the $B_1$ modulator valve 30.

2-3 shift valve 37 is shown in the state in which the D range line pressure supply port 37f and the port 37i are communicating with each other, and the line pressure from said D range line pressure supply port 37f is applied via the port 37i and the oil line g to the first input port 32d of the $B_1$ modulator control valve 32. In the first and second speed states, said control valve 32 is in its upper half position so that the oil pressure at its input port 32d is applied via the output port 32b to the constraining control oil chamber 30c of the $B_1$ modulator valve 30.

As a result, this modulator valve 30 is constrained in its lefthand half position, and the line pressure at the aforementioned line pressure supply port 30b is outputted without any change to the pressure modulation port 30a until it is applied by way of an oil line f to the brake engaging oil pressure chamber 31 of the first brake hydraulic servo $B_1$. As a result, the first brake B1 has its band fastened by the intensive force based upon the line pressure.

At the time of an upshift from the 1st to 2nd speeds, too, the throttle pressure control valve 5 is properly controlled like as in the aforementioned shift to the D range by the electric signal coming from the control unit, and the line pressure is applied to the back pressure chambers $7_1$ to $7_4$ of the accumulators $2_1$ to $2_4$ by the throttle pressure. As a result, the B1 brake hydraulic servo $B_1$ is properly adjusted in accordance with the engagement characteristics of brake B1 by having its accumulator $2_4$ controlled to a proper back pressure so that the first brake B1 is smoothly engaged.

Meanwhile the back pressures in accumulators $2_1$, $2_2$ and $2_3$ for the remaining clutches C1, C2 and C0 are controlled. However, the second clutch C2 and the fourth clutch C0 are in their released states and receive no influence. In the first clutch C1, the hydraulic servo $C_1$ has its oil pressure changed with the change in the line pressure based upon the throttle pressure change. However, this clutch C1 is already in the engaged static friction state, and the engaging oil pressure is at a level far higher than the torque load of the clutch, so that the clutch C1 is not slipped.

In the 2nd speed state, moreover, in which the first brake B1 and the second one-way clutch F0 as well as the first clutch C1 are engaged, the rotations of the input shaft 15 are transmitted though the first clutch C1 and the second one-way clutch F0 to the smaller ring gear R1, and the sun gear S is stopped by the first brake B1. As a result, the rotation of the smaller ring gear R1 becomes the 2nd speed output through the carrier CR while allowing the larger ring gear R2 to rotate idly.

Here in this 1st to 2nd speed shift, the first one-way clutch F1 overruns to prevent the shift shocks, which might otherwise be caused by the engagement change.

In the 3rd speed state, moreover, the second solenoid valve $S_L2$ is maintained in its ON state, and the first solenoid valve $S_L1$ is switched to its OFF state.

In this state, the 1-2 shift valve 36 and the 3-4 shift valve 39 are held in their lower half positions, and the 2-3 shift valve 37 is switched to its upper half position by having its control oil chamber 37d fed with the oil pressure. As a result, the line pressure of the oil line a, which is supplied via the 1-2 shift valve ports 36a and 36b, is introduced via the input port 37a and the output port 37b into the oil line b so that it is supplied to the fourth clutch hydraulic servo $C_0$ and the accumulator chamber $9_3$ of the accumulator $2_3$.

Moreover, the 2-3 shift valve 37 has the communication of its port 37i switched from the D range line pressure supply port 37f to the drain port 37c so that the oil pressure to the first input port 32d of the $B_1$ modulator control valve 32 is drained. Moreover, the oil pressure supplied to the hydraulic servo $C_0$ is exerted via the oil line c upon the constraining control oil chamber 80b of the C3 timing valve 80 to switch this valve 80 to the righthand half position. As a result, the line pressure from the line pressure port 39d of the 3-4 shift valve 39 is supplied via the port 39i to the input port of the C3 timing valve 80 and further via the output port and the modulator valve 68 to the third clutch hydraulic servo $C_3$.

When the oil pressure of the fourth clutch hydraulic servo $C_0$ and its accumulator $2_3$ rises to a predetermined level, it is applied to the first control oil chamber 33d of the 2-3 timing valve 33 so that this valve 33 is switched to its upper half position. As a result, the oil pressure from the oil line b is quickly applied to the oil line d via the line pressure supply port 33a and the output port 33b and further to the brake releasing oil pressure chamber 35 of the first brake hydraulic servo $B_1$ via the ports 39a and 39b.

In this state, moreover, the oil pressure of the hydraulic servo $C_0$ is exerted via the oil line c upon the control chamber 32c of the $B_1$ modulator control valve 32 to switch this valve 32 to its lefthand half position. However, the 3-4 shift valve 39 has its port 39c communicating with the drain port 39e, and the $B_1$ modulator control valve 32 has its second input port 32a as well as its first input port 32d drained. As a result, the $B_1$ modulator valve 30 is in its pressure modulating state so that its line pressure supply port 30b has its line pressure reduced at a predetermined ratio by the feedback pressure of the feedback port 30d. Thus, said modulator pressure is exerted through the oil line f upon the brake engaging oil pressure chamber 31 of the first brake hydraulic servo $B_1$.

As a result, in this hydraulic servo $B_1$, the line pressure acting upon the brake releasing oil pressure chamber 35 overcomes the modulator pressure acting upon the brake engaging oil pressure chamber 31 to release the band brake B1. At this time, the oil pressure of the hydraulic servo $C_0$ communicating with the accumulator $2_3$ is boosted to switch the 2-3 timing valve 33. As a result, the oil pressure is prevented from being quickly supplied to the brake releasing oil pressure chamber 35. Thus, the first brake B1 is prevented from being released prior to the engagement of the fourth clutch C0, and accordingly return to the first speed, for even an instant, is prevented.

At the shift from the 2nd to 3rd speed, moreover, the throttle pressure control valve 5 is also properly controlled by the electric signal, and the line pressure is controlled according to said throttle pressure by the accumulator control valve 20. This controlled pressure is supplied to the back pressure chambers $7_1$ to $7_4$ of the accumulators $2_1$ to $2_4$ and to the second control chamber $33d$ of the 2-3 timing valve 33.

As a result, the accumulator back pressure control is performed like before on the basis of the throttle pressure control valve 5, and the oil pressure of the hydraulic servo $C_0$ is controlled to match the engagement characteristics of the clutch C0 so that said clutch C0 is smoothly engaged. At the same time, the switching timing of the timing valve 33 is properly adjusted to time the engagement of the fourth clutch C0 and the release of the first brake B1 properly.

Simultaneously with this, the control oil chamber $30e$ of the $B_1$ modulator valve 30 is also supplied with the oil pressure from the output port $20b$ of the accumulator control valve so that its modulator pressure is properly modulated to a higher level. The oil pressure thus modulated is supplied via the oil line f to the brake engaging oil pressure chamber 31 to time the release of said brake B1 properly in accordance with the control of the aforementioned timing valve 33.

In the 3rd speed state, on the other hand, in which the third clutch C3 and the fourth clutch C0 as well as the first clutch C1 are engaged whereas the first brake B1 is released, the rotation of the input shaft 15 is transmitted through the one-way clutch F0 and the third clutch C3 to the smaller ring R1 and further through the fourth clutch C0 to the larger ring gear R2 so that the integral rotation of the planetary gear unit 12 is extracted from the carrier CR through the output gear 13.

At this time, the engagement change between the fourth clutch C0 and the first brake B1 occurs. However, no shift shock will take place because the proper timing is provided, as described above, and because the shifts via other gear stages are blocked. Simultaneously with this, moveover, the third clutch C3 is also engaged, and this engagement timing may be slow because said clutch C3 is in parallel with the second one-way clutch F0. Next, in the 4th speed state, the first solenoid valve $S_L1$ is OFF, and the second solenoid valve $S_L$ is switched OFF. In this state, the 2-3 shift valve 37 is held in its upper half position, and the 3-4 shift valve 39 is switched to its upper half position by having its control chamber $39f$ fed with the control oil pressure. On the other hand, the 1-2 shift valve 36 has its control oil chamber $36d$ fed with the control oil pressure but its constraining control oil chamber $36g$ fed with the line pressure of the line pressure supply port $37f$ of the 2-3 shift valve 37 via the port $37h$, so that the 1-2 shift valve 36 is held in its lower half position. As a result, the 3-4 shift valve 39 has its $B_1$ relief port $39b$ communicating with the drain port $39e$ so that the brake engaging oil pressure chamber 31 of the first brake hydraulic servo $B_1$ is drained.

At the aforementioned 3rd speed, since the oil pressure is supplied to the fourth clutch hydraulic servo $C_0$, the oil pressure is supplied via the oil line c to the control oil chamber $32c$ of the $B_1$ modulator control valve 32 so that this valve 32 is switched to its lower half position in which the second input port $32a$ and the output port $32b$ are communicating with each other. If, in this state, the 3-4 shift valve 39 is switched at the 4th speed to have its line pressure supply port $39d$ communicating with the port $39c$, the line pressure is fed via the ports $39d$ and $39c$ and the ports $32a$ and $32b$ of the $B_1$ modulator control valve to the constraining control oil chamber $30c$ of the $B_1$ modulator valve 30 so that this modulator valve 30 is switched to the line pressure supply state in which the line pressure port $30b$ and the pressure modulation port $30a$ are communicating with each other.

As a result, the line pressure is introduced as it is to the oil line f via the ports $30b$ and $30a$ so that the oil pressure supplied to the brake engaging oil pressure chamber 31 of the first brake hydraulic servo $B_1$ is switched from the modulator pressure to the line pressure. At this time, like before, the shift can be smoothed by controlling the oil pressure to be supplied to the back pressure chamber $7_4$ of the accumulator $2_4$ on the basis of the electric control the throttle pressure control valve 5. Despite of this fact, however, the engagement of the first brake B1 is controlled by adjusting the drain oil pressure from the brake releasing oil pressure chamber 35 by means of orifices $83a$, $83b$, $83c$ and so on.

Since the 3-4 shift valve 39 has its C3 timing port $39i$ communicating with the drain port $39j$, the oil pressure of the third hydraulic servo $C_3$ is drained through a check valve 85 and the C3 timing valve 80 and via the ports $39i$ and $39j$ of the 3-4 shift valve 39.

The 4th speed state, the throttle pressure control valve 5 is controlled to maintain a rather high level by the electric signal coming from the control unit, and the accumulator back pressure or the output pressure of the accumulator control valve 20 is also set to a rather high level.

In the 4th speed state, the first clutch C1 and the fourth clutch C0 are in their engaged states, and the first brake B1 is switched to its engaged state whereas the third clutch C3 is switched to its released state. In this 4th speed state, the rotation of the input shaft 15 is transmitted through the fourth clutch C0 to the larger ring gear R2. At the same time, the sun gear S is stopped by the first brake B1 so that the rotation of said larger ring gear R2 rotates the carrier CR at a high speed while rotating the ring gear R1 idly. The rotation of the carrier CR is transmitted to the output gear 13. At this time, the first brake B1 is engaged, and the third clutch C3 is released. Even if, however, the third clutch C3 is prematurely released, the 3rd speed state is maintained by the second one-way clutch F0. As a result, the shift shocks, which might otherwise be caused by the engagement change, can be prevented by delaying the engagement of the first brake B1 by means of the orifices $83a$ to $83c$.

At the downshift from the 4th to 3rd speeds, on the other hand, the 3-4 shift valve 39 is switched to its lower half position, as has been described hereinbefore, the oil pressure of the oil line b is supplied via the ports $39a$ and $39b$ to the brake releasing oil pressure chamber 35 of the first brake hydraulic servo $B_1$, and the line pressure of the line pressure supply port $39d$ is supplied via the port $39i$ and thorough the C3 timing valve 80 and the $C_3$ modulator valve 68 to the third clutch hydraulic servo $C_3$. At this time, the release oil pressure to be supplied to the brake releasing oil pressure chamber 35 of the hydraulic servo $B_1$ is controlled by means of the orifices $83b$ and $83c$, and the second one-way clutch F0 is switched from the overrun to the engagement, so that the shift can be smoothly effected. At the downshift from the 3rd to 2nd speed, moreover, the 2-3 shift valve 37 is switched to its lower half position, as has been described hereinbefore, to have its $C_0$ port 37b and drain port 37c communicating with each other. Then, the oil pressure in the brake releasing oil pressure chamber 35 of the hydraulic servo $B_1$ is drained at first from the drain port 37c via the ports 39b and 39a, the oil line d, the oil line e, the oil line b and the port 37b, and the oil pressure of the third clutch hydraulic servo $C_0$ is drained together with the oil pressure of the accumulator chamber $9_3$ of the accumulator $2_3$ from the drain port 37c via the oil line b and the port 37b.

As a result, the release of the fourth clutch C0 is delayed relative to the engagement of the first brake B1 thereby to prevent the shifting operations from the 3rd through 1st to 2nd speeds, namely, the shift which will pass the 1st speed state having both the fourth clutch C0 and the first brake B1 released. Incidentally, at the downshift from the 3rd to 2nd speeds, the C3 timing valve 80 is switched to its lefthand hand position by having its constraining control oil chamber 80b relieved from the oil pressure based upon the hydraulic servo $C_0$, so that the oil pressure of the hydraulic servo $C_3$ is drained via the check valve 85 from the drain port of the C3 timing valve 80.

At the downshift from the 2nd to 1st speeds, moreover, the 1-2 shift valve 36 is switched to its upper half position to have its output port 36b communicating with its drain port 36c. As a result, the oil pressure of the brake engaging oil pressure chamber 31 of the first brake hydraulic servo $B_1$ is discharged to the drain port 36c from the oil line f, the ports 30a and 30b of the $B_1$ modulator valve 30, the check valve 99, the oil line a and the port 36b.

At the kickdown from the 4th to 2nd speeds, on the other hand, the 3-4 shift valve 39 is switched to its lower half position, and the 2-3 shift valve 37 is also switched to its lower half position. As a result, the oil pressure of the fourth clutch hydraulic servo $C_0$ is discharged from the drain port 37c via the oil line b and the port 37b, and the oil pressure of the brake releasing oil pressure chamber 35 of the first brake hydraulic servo $B_1$ is also discharged form the drain port 37c via the ports 39a and 39b, the oil line d, the check valve 41, the oil lines e and a and the port 37b.

At this time, the $B_1$ modulator control valve 32 is switched to its righthand half position by having its control oil chamber 32c relieved from its oil pressure based upon the hydraulic servo $C_0$. At the same time, the $B_1$ modulator control valve 32 has its input port 32a drained to relieve the constraining pressure of the constraining control oil chamber 30c of the $B_1$ modulator valve 30 so that this valve 30 generates the modulator valve pressure. However, the $B_1$ modulator valve 30 is constrained in its line pressure supplied state because the line pressure is instantly supplied to the port 32d of the control valve 32 via the port 37i of the 2-3 shift valve 37 and further to the constraining control oil chamber 30c via the port 32b.

As a result, the first brake B1 is maintained in its engaged state without passing through any released state so that the downshift is quickly and smoothly effected by the single operation. If, on the other hand, the manual valve 62 is shifted to the R range, the line pressure is supplied from the R range port to the second clutch hydraulic servo $C_2$ and its accumulator $2_2$. At this time, like before, the throttle pressure control valve 5 is properly controlled to the proper level by the electric signal coming from the control unit, and the oil pressure having acted upon the accumulator control valve 20 and dropped from the line pressure is supplied to the back pressure chambers $7_1$ to $7_4$ of the accumulators $2_1$ to $2_4$ to control the back pressure of the accumulator $2_2$. As a result, the oil pressure of the hydraulic servo $C_2$ is controlled to correspond to the engagement characteristics of the second clutch C2 so that the shifts from the N to R ranges or from the D to R ranges can be smoothed. In this reverse (R) range, that is, in case the vehicle is running at a predetermined low speed, e.g., 7 Km/H or substantially in the halted state, the 1-2 shift valve 36 is in its upper half position, and the line pressure from the R range port is supplied to the second brake hydraulic servo $B_2$ through the two-way check valve and via the ports 36f and 36e.

In the reverse state, moreover, in which the second clutch C2 and the second brake B2 are engaged, the rotation of the input shaft 15 is transmitted through the second clutch C2 to the sun gear S. Since, moreover, the larger ring gear R2 is stopped by the second brake B2, the rotation of said sun gear S is reversed and transmitted to the carrier CR, while reversing the smaller ring gear R1 idly, so that this reverse rotation is extracted from the output gear 13.

In the reverse range, moreover, in case the vehicle is coasting at a predetermined speed or more, the second solenoid valve $S_L2$ is turned ON to switch the 1-2 shift valve 36 to its lower half position. In this state, no oil pressure is supplied to the second brake hydraulic servo $B_2$ and the aforementioned reverse state is avoided.

If the manual valve 62 is shifted to the 2nd range, on the other hand, the line pressure of the 2nd range port is supplied to the constraining control oil chamber 39h of the 3-4 shift valve 39 so that this valve 39 is blocked from coming into its upper half position, i.e., the 4th speed position.

Moreover, the line pressure of the 2nd range port is supplied to the constraining control oil chamber 80b of the C3 timing valve 80 to hold this valve 80 in its righthand half position so that the third clutch hydraulic servo $C_3$ is always supplied with the oil pressure at the 1st, 2nd and 3rd speeds.

As a result, the input shaft 15 and the smaller ring gear R1 are connected through the third clutch C3 so that the braking by the engine is established by eliminating the coasting of the vehicle, which might otherwise be caused by the overrun of the second one-way clutch F0.

If, moreover, the manual valve 62 is shifted to the 1st range, the line pressure of the 1st range port is supplied to the constraining control oil chamber 37e of the 2-3 shift valve 37 so that this valve 37 is blocked from coming into its upper half position, i.e., the 3rd and 4th speed positions. The line pressure of the 1st range port is reduced by a low modulator valve 79. This modulated pressure is supplied through the two-way check valve to the port 36f of the 1-2 shift valve 36 and further to the second brake hydraulic servo $B_2$ at the 1st speed. Incidentally, the embodiment thus far described uses the $B_1$ modulator control valve 32, which is not always indispensable.

INDUSTRIAL APPLICABILITY

The automatic transmission of the present invention can be applied to all the automatic transmissions and can be suitably used as the automatic transmission which is small-sized for the FF.

We claim:

1. An automatic transmission comprising:
   a casing;
   an input shaft;
   planetary gearing mounted within said casing and including:
   a single planetary gear unit having a first sun gear, a first ring gear, a first pinion meshing with said first sun gear and said first ring gear, and a common carrier supporting said first pinion; and
   a dual planetary gear unit having a second sun gear connected to said first sun gear, a second ring gear, a second pinion meshing with said second sun gear and a third pinion meshing with said second ring gear and said second pinion, said common carrier supporting said second and third pinions;
   a connecting member provided between said input shaft and said planetary gearing selectively connecting said input shaft with said planetary gearing;
   a first clutch selectively connecting said input shaft with said connecting member;
   a second clutch selectively connecting said input shaft with said first and second sun gears;
   a third clutch selectively connecting said connecting member with said second ring gear, thereby connecting said second ring member with said input shaft through said first clutch and said connecting member;
   a first brake selectively connecting said first and second sun gears with said casing;
   a second brake selectively connecting said second ring gear with said casing;
   a first one-way clutch selectively connecting said connecting member with said first ring gear, thereby connecting said input shaft with said first ring gear through said connecting member and said first clutch; and
   an output member connected to said common carrier.

2. An automatic transmission as set forth in claim 1, further comprising:
   a fourth clutch provided in parallel with said first one-way clutch for selectively connecting said connecting member with said first ring gear, thereby connecting said input shaft with said first ring gear through said connecting member and said first clutch.

3. An automatic transmission as set forth in claim 2, furthermore comprising:
   a second one-way clutch for selectively connecting said second ring gear with said casing.

4. An automatic transmission as set forth in claim 1,
   wherein said planetary gearing is located between said first clutch and said second clutch;
   wherein said second clutch is adjacent said first brake, and
   wherein said output member carries an output gear, said output gear being located between said planetary gearing and said second clutch.

5. An automatic transmission as set forth in claim 2,
   wherein said planetary gearing is located between said first clutch and said second clutch;
   wherein said second clutch is adjacent said first brake, and
   wherein said output member carries an output gear, said output gear being located between said planetary gearing and said second clutch.

6. An automatic transmission as set forth in claim 3,
   wherein said planetary gearing is located between said first clutch and said second clutch;
   wherein said second clutch is adjacent said first brake, and
   wherein said output member carries an output gear, said output gear being located between said planetary gearing and said second clutch.

7. An automatic transmission as set forth in claim 2, wherein said fourth clutch is mounted adjacent said first ring gear.

* * * * *

UNITED STATES PATENT AND TRADEMARK OFFICE
CERTIFICATE OF CORRECTION

PATENT NO. : 5,224,908   PAGE 1 of 3
DATED : July 6, 1993
INVENTOR(S) : NISHIDA et al It is certified that error appears in the above-indentified patent and that said Letters Patent is hereby corrected as shown below:

Col. 1, line 9, after "for" insert --an--;

line 16, delete "simpson" insert --Simpson--;

line 34, delete "spaced" insert --speed--;

line 46, after "cause" insert --a--;

line 58, after "gear" insert --unit--.

Col. 2, line 6, delete "a", first instance;

line 15, delete "R2" and insert --R2'--;

line 16, delete "Brake" and insert --The brake--;

line 34, delete "gear" insert --gears--;

line 51, delete "There" insert --Further, there--.

UNITED STATES PATENT AND TRADEMARK OFFICE
CERTIFICATE OF CORRECTION

PATENT NO. : 5,224,908
DATED : July 6, 1993
INVENTOR(S) : NISHIDA et al

It is certified that error appears in the above-indentified patent and that said Letters Patent is hereby corrected as shown below:

Col. 3, line 21, delete " "and delete";

line 22, delete " "A", second instance;";

line 23, delete "A"; and line 55, delete "Reduction" insert

--The reduction--.

Col. 4, line 18, before "3" insert --Numeral--;

line 33, before "65" insert --Numeral--;

line 42, delete "the" insert --their--;

line 46, delete "accumulators" insert

--accumulator--; and line 58, after "includes" insert --a--.

Col. 5, line 42, before "32" insert --Numeral--;

line 57, delete "is branched off"; delete "branches", and insert --is branched off--.

UNITED STATES PATENT AND TRADEMARK OFFICE
CERTIFICATE OF CORRECTION

PATENT NO. : 5,224,908

DATED : July 6, 1993

INVENTOR(S) : NISHIDA et al

It is certified that error appears in the above-indentified patent and that said Letters Patent is hereby corrected as shown below:

Col. 7, line 19, before "2-3" insert --The--.

Col. 10, line 19, after "control" insert --of--;

line 20, delete "of";

line 29, delete "The" insert --In--.

Signed and Sealed this

Third Day of January, 1995

*Attest:*

BRUCE LEHMAN

*Attesting Officer*     *Commissioner of Patents and Trademarks*